(12) United States Patent
Koshihara et al.

(10) Patent No.: US 11,681,147 B2
(45) Date of Patent: Jun. 20, 2023

(54) DISPLAY DEVICE WITH AT LEAST TWO EMITTING ELEMENTS AND TWO FILTERS, AND DIFFERENT POSITIONAL RELATIONSHIPS

(71) Applicant: SEIKO EPSON CORPORATION, Tokyo (JP)

(72) Inventors: Takeshi Koshihara, Matsumoto (JP); Hitoshi Ota, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/733,038

(22) Filed: Apr. 29, 2022

(65) Prior Publication Data

US 2022/0252888 A1    Aug. 11, 2022

Related U.S. Application Data

(63) Continuation of application No. 17/332,609, filed on May 27, 2021, now Pat. No. 11,347,064, which is a
(Continued)

(30) Foreign Application Priority Data

Aug. 21, 2014   (JP) ................... 2014-168236

(51) Int. Cl.
*G02B 27/01* (2006.01)
*G02B 5/20* (2006.01)
*H05B 33/12* (2006.01)

(52) U.S. Cl.
CPC .......... *G02B 27/0172* (2013.01); *G02B 5/20* (2013.01); *G02B 5/201* (2013.01); *G02B 27/017* (2013.01);
(Continued)

(58) Field of Classification Search
CPC ...... G02B 27/0172; G02B 5/20; G02B 5/201; G02B 27/017; G02B 2027/0112; G02B 2027/0147; G02B 2027/0178; H05B 33/12
See application file for complete search history.

(56) References Cited

U.S. PATENT DOCUMENTS 6,552,488 B1   4/2003   Roitman et al.
8,395,308 B2   3/2013   Asaki
(Continued)

FOREIGN PATENT DOCUMENTS

JP   H06-55137 U    7/1994
JP   2001-126864 A  5/2001
(Continued)

OTHER PUBLICATIONS

Aug. 25, 2017 Office Action issued in U.S. Appl. No. 15/503,624.
(Continued)

*Primary Examiner* — Tracie Y Green
(74) *Attorney, Agent, or Firm* — Oliff PLC

(57) ABSTRACT

The display device includes the first light-emitting element, a second light-emitting element, a first color filter through which light from the first light-emitting element passes, and a second color filter through which the light from the second light-emitting element passes. The relative positional relationship between the center of the first light-emitting element and the center of the first color filter is different from the relative positional relationship between the center of the second light-emitting element and the center of the second color filter.

10 Claims, 10 Drawing Sheets

Related U.S. Application Data continuation of application No. 16/270,162, filed on Feb. 7, 2019, now Pat. No. 11,048,086, which is a continuation of application No. 15/983,613, filed on May 18, 2018, now Pat. No. 10,247,948, which is a continuation of application No. 15/503,624, filed as application No. PCT/JP2015/004131 on Aug. 19, 2015, now Pat. No. 10,007,120.

(52) U.S. Cl.
CPC ...... *H05B 33/12* (2013.01); *G02B 2027/0112* (2013.01); *G02B 2027/0147* (2013.01); *G02B 2027/0178* (2013.01)

(56) References Cited

U.S. PATENT DOCUMENTS

| | | | |
|---|---|---|---|
| 8,970,100 | B2 | 3/2015 | Asaki |
| 9,117,719 | B2 | 8/2015 | Saito |
| 9,140,427 | B2 | 9/2015 | Asaki |
| 10,007,120 | B2 | 6/2018 | Koshihara et al. |
| 10,247,948 | B2 | 4/2019 | Koshihara et al. |
| 10,325,560 | B1 | 6/2019 | Tiana et al. |
| 10,670,929 | B2 | 6/2020 | Shi et al. |
| 11,048,086 | B2 | 6/2021 | Koshihara et al. |
| 2003/0001797 | A1 | 1/2003 | Sato et al. |
| 2008/0157087 | A1* | 7/2008 | Kim ................... G02B 30/27 |
| | | | 257/E31.127 |
| 2009/0244449 | A1 | 10/2009 | Yoshioka et al. |
| 2010/0289101 | A1 | 11/2010 | Vaillant et al. |
| 2011/0043096 | A1 | 2/2011 | Asaki |
| 2011/0096504 | A1 | 4/2011 | Hild |
| 2013/0127326 | A1 | 5/2013 | Asaki |
| 2013/0222676 | A1* | 8/2013 | Ono ....................... G03B 17/02 |
| | | | 348/345 |
| 2013/0222896 | A1 | 8/2013 | Komatsu et al. |
| 2014/0284590 | A1* | 9/2014 | Nakazawa ............. H05B 33/26 |
| | | | 359/885 |
| 2015/0060906 | A1 | 3/2015 | Asaki |
| 2015/0062490 | A1* | 3/2015 | Kwon ................... G02B 6/0068 |
| | | | 349/64 |
| 2015/0155346 | A1 | 6/2015 | Motoyama et al. |
| 2016/0025302 | A1* | 1/2016 | Shiratori ............. H01L 27/3213 |
| | | | 362/231 |
| 2017/0176752 | A1 | 6/2017 | Vieira et al. |
| 2019/0267517 | A1* | 8/2019 | Koshihara ............. H01L 33/505 |

FOREIGN PATENT DOCUMENTS

| | | |
|---|---|---|
| JP | 2004-029236 A | 1/2004 |
| JP | 2007-333818 A | 12/2007 |
| JP | 2010-117479 A | 5/2010 |
| JP | 2011-040352 A | 2/2011 |
| JP | 2013-200553 A | 10/2013 |
| JP | 2014-130218 A | 7/2014 |
| WO | 2014/049993 A1 | 4/2014 |

OTHER PUBLICATIONS

Feb. 28, 2018 Notice of Allowance issued in U.S. Appl. No. 15/503,624.
Aug. 3, 2018 Office Action issued in U.S. Appl. No. 15/983,613.
Dec. 3, 2018 Notice of Allowance issued in U.S. Appl. No. 15/983,613.
Sep. 28, 2020 U.S. Office Action issued U.S. Appl. No. 16/270,162.
Feb. 3, 2022, Notice of Allowance Issued in U.S. Appl. No. 17/332,609.

* cited by examiner

[Fig. 1]
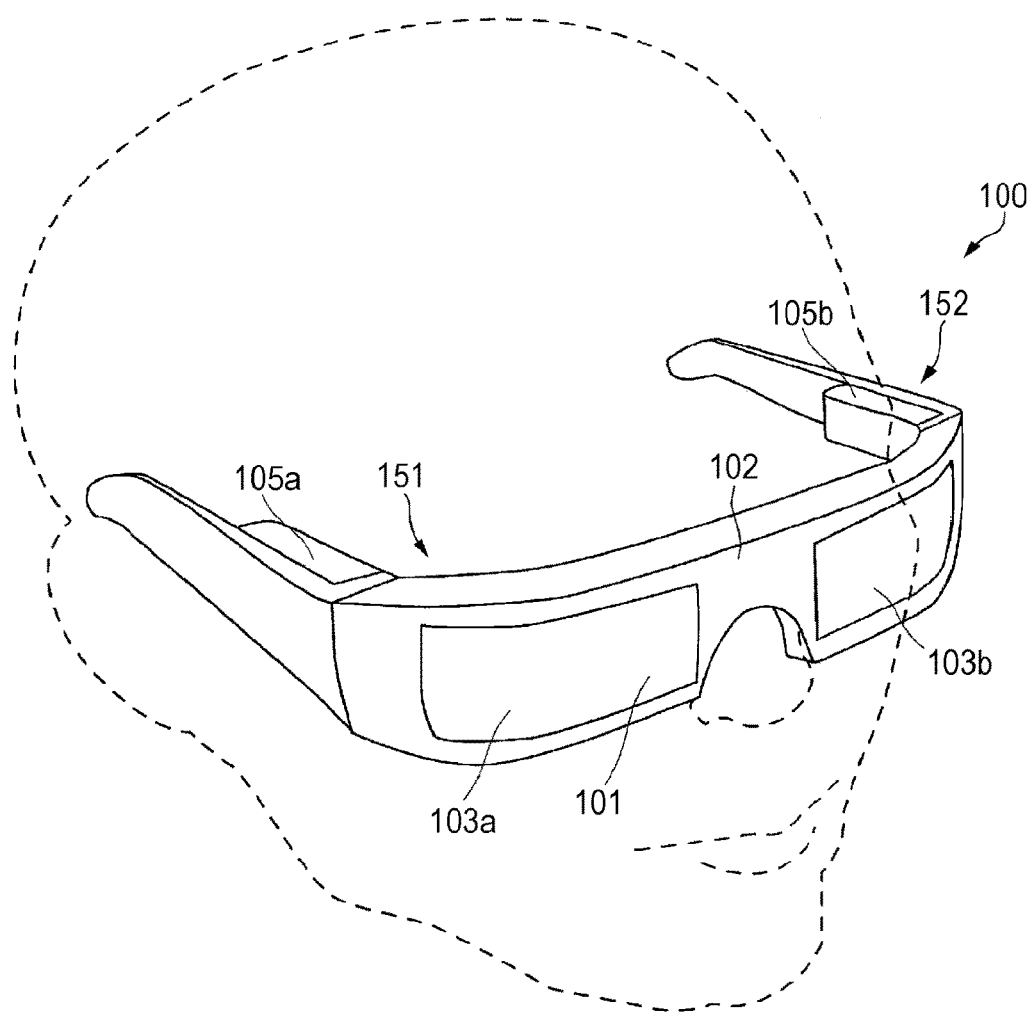

[Fig. 2]
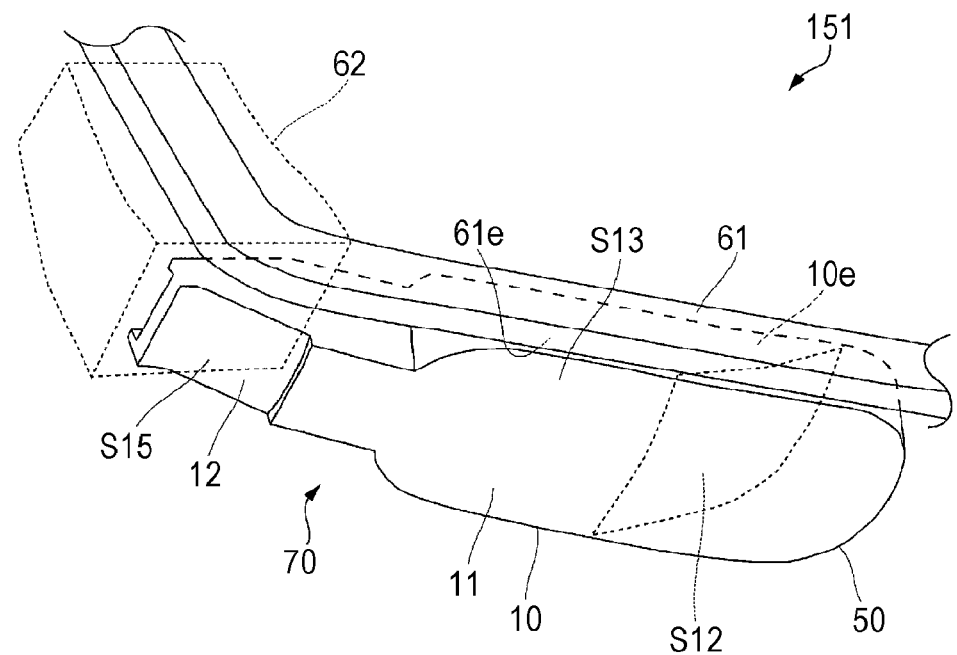
[Fig. 3]
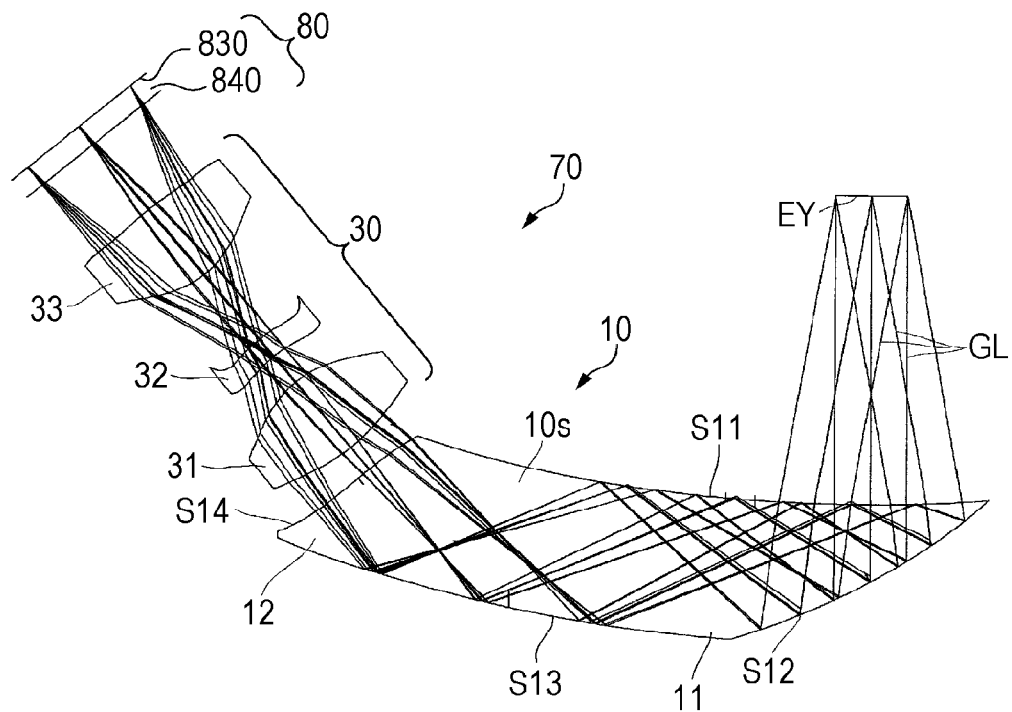

[Fig. 6A]
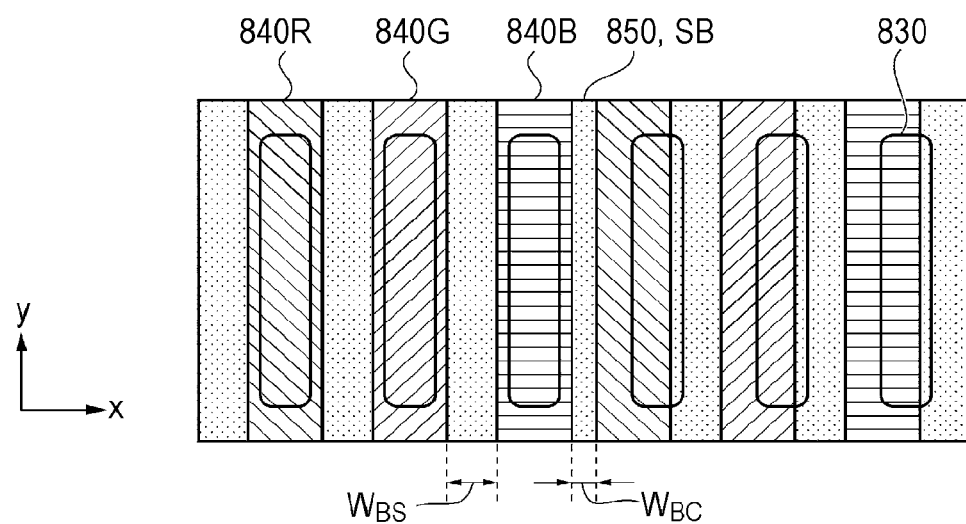
[Fig. 6B]
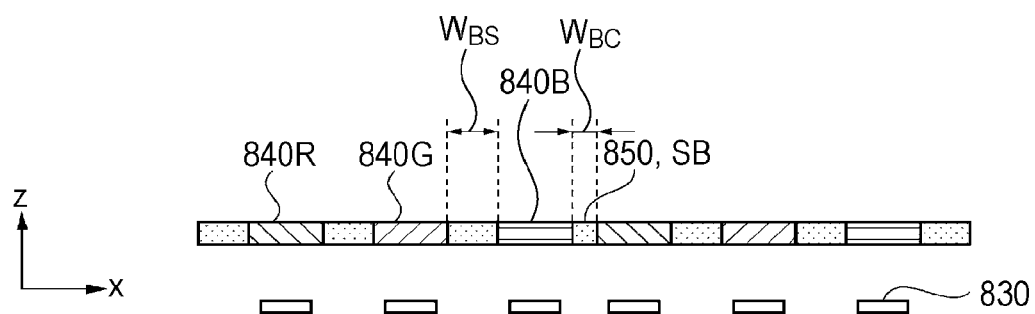

[Fig. 7]
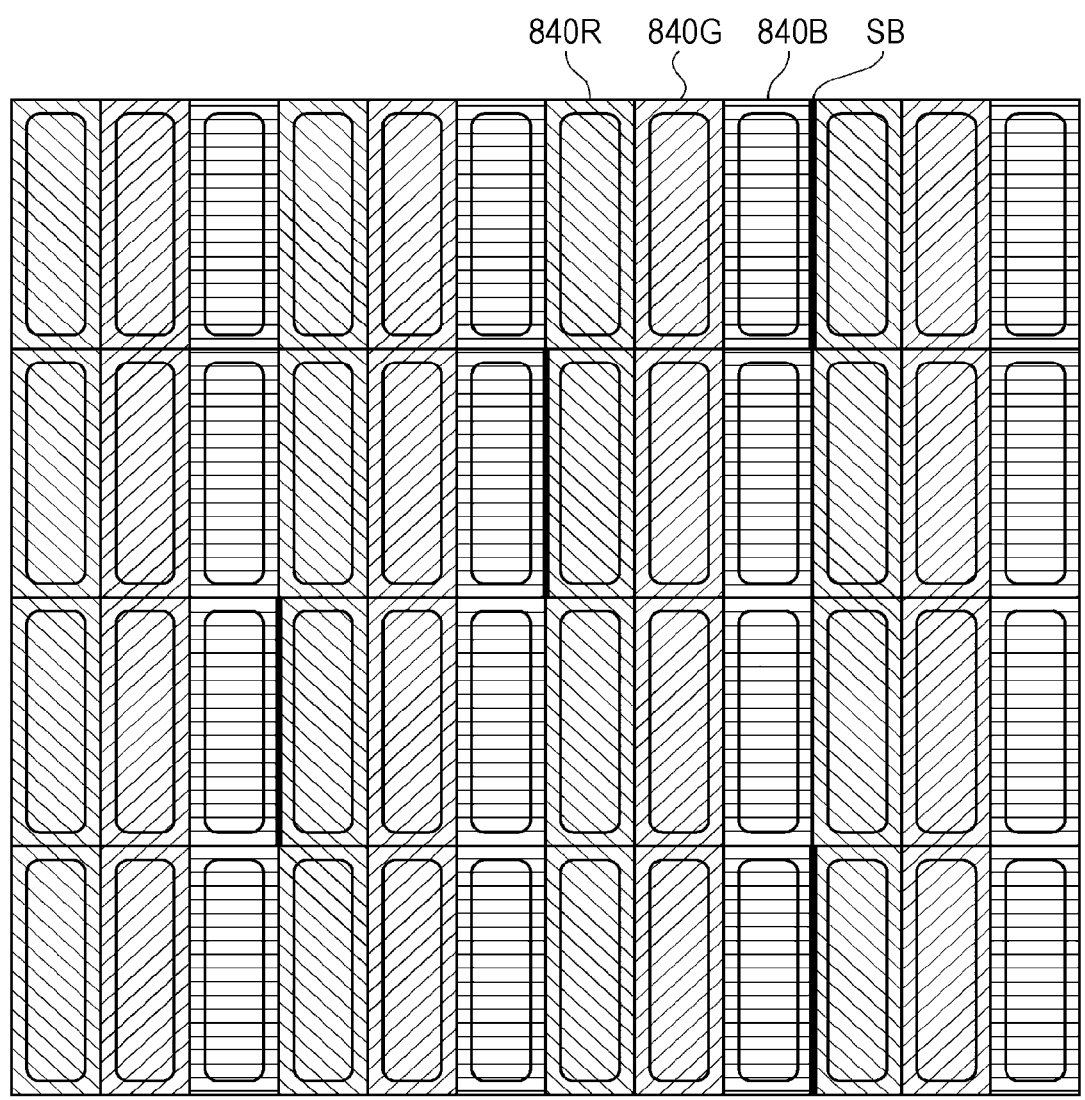

[Fig. 8]
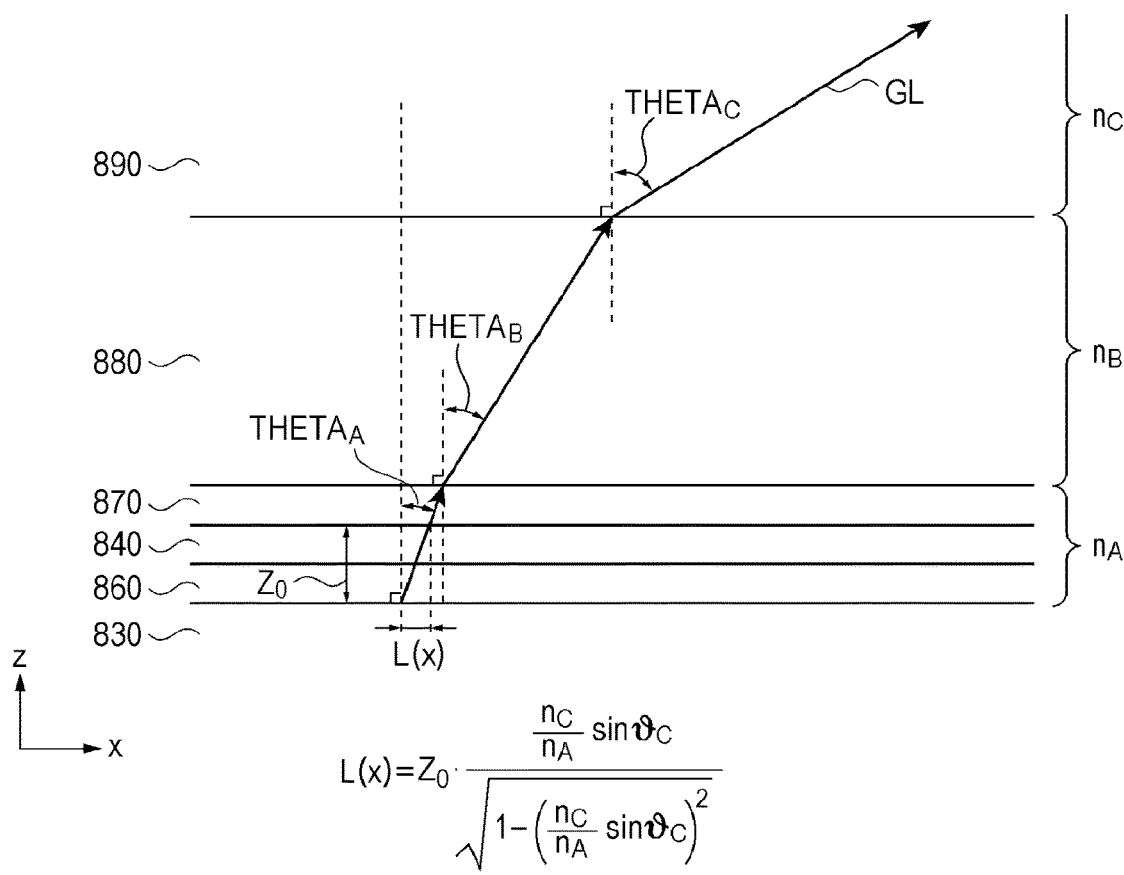

[Fig. 9A]
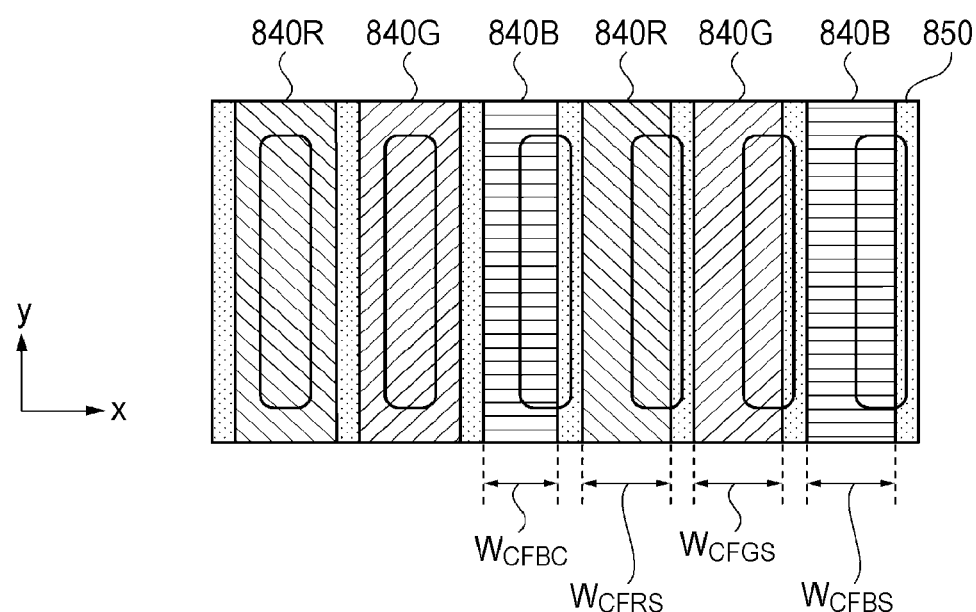
[Fig. 9B]
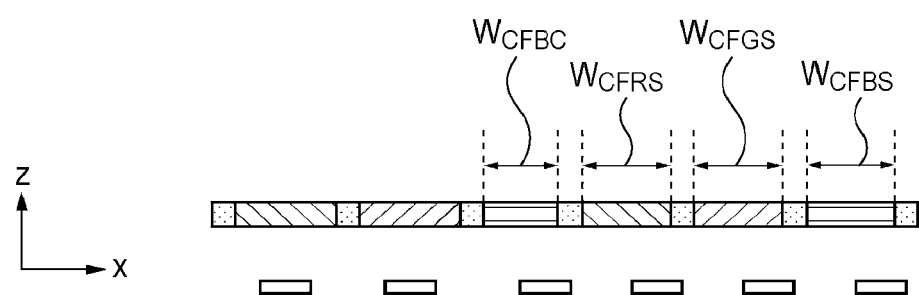

[Fig. 10]
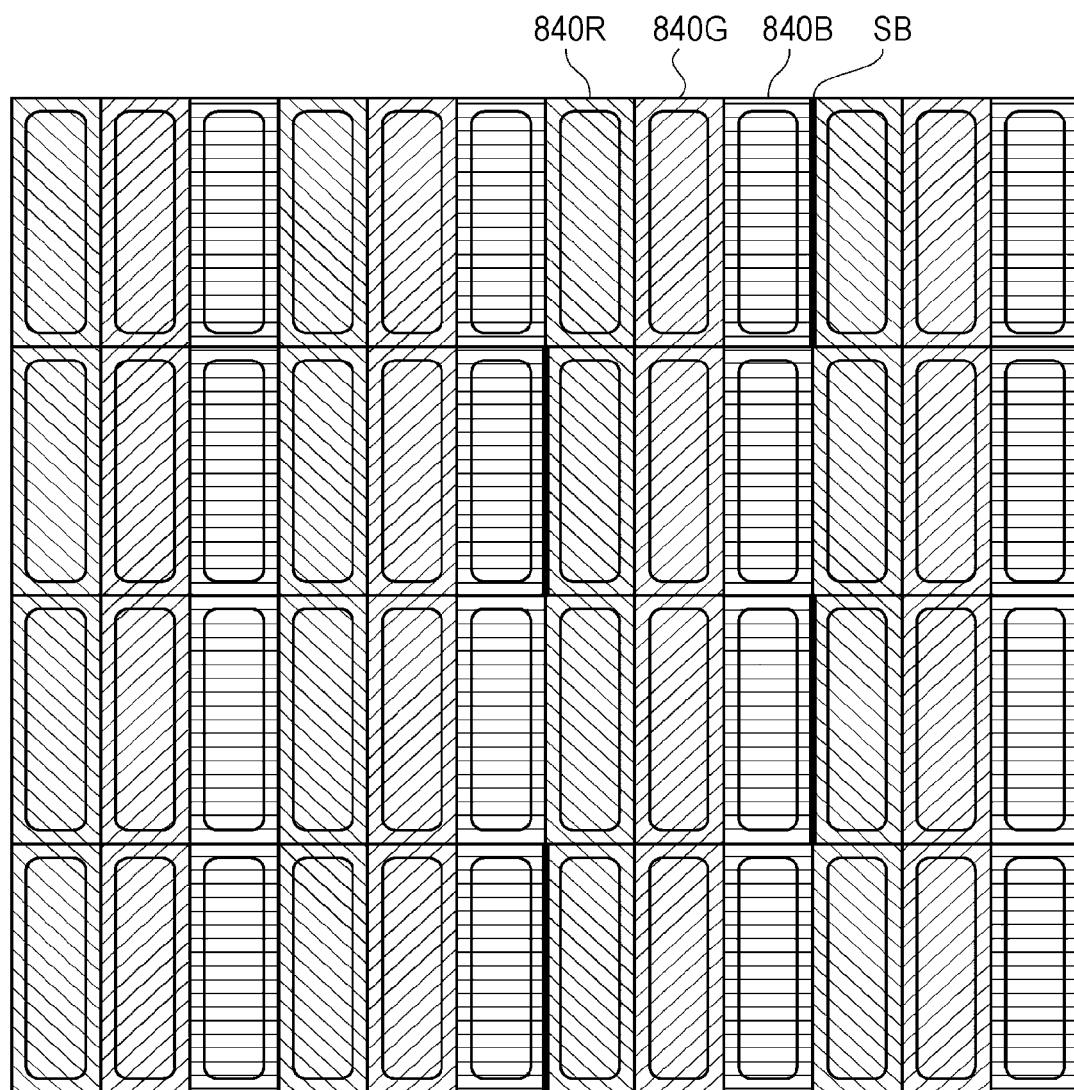

[Fig. 11]
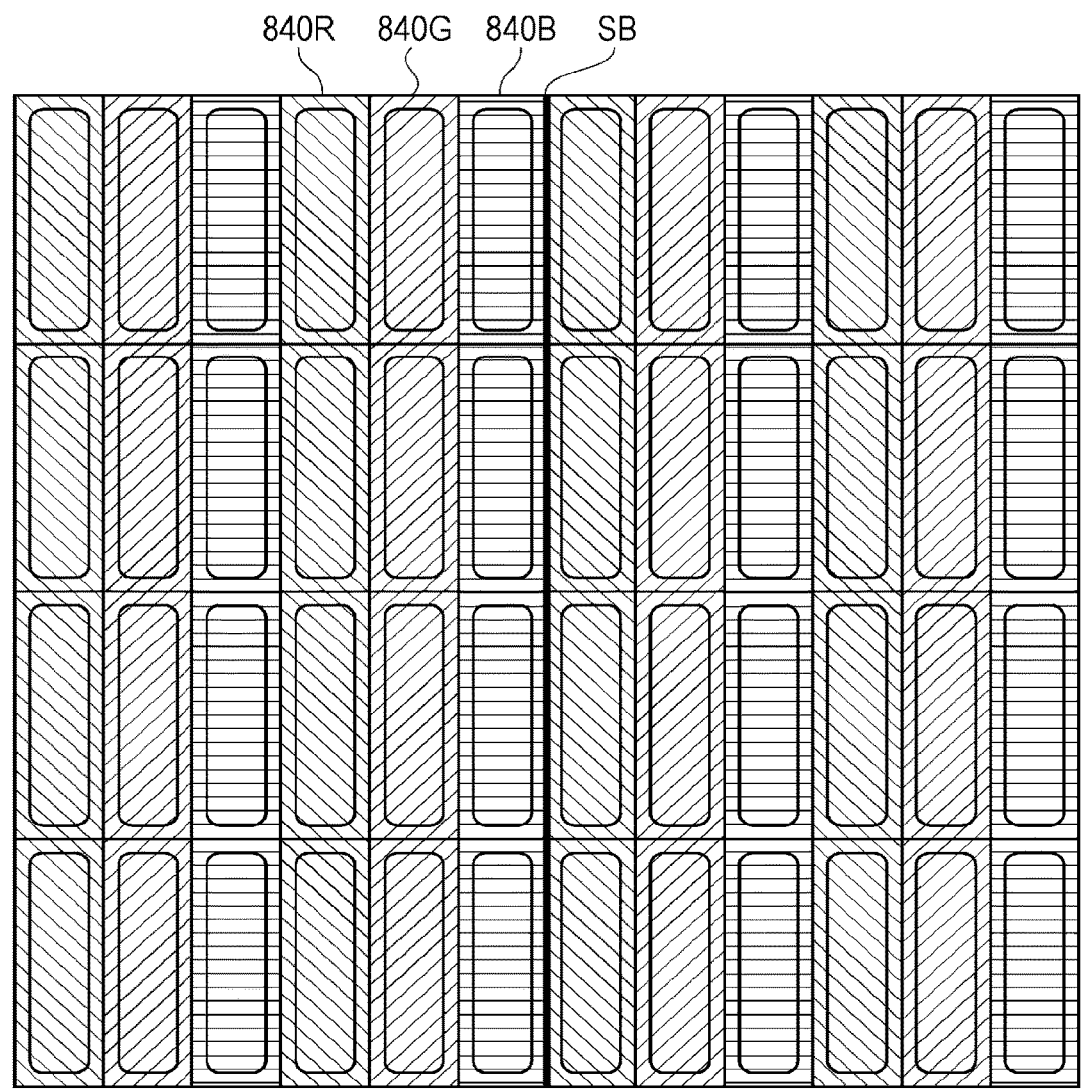

DISPLAY DEVICE WITH AT LEAST TWO EMITTING ELEMENTS AND TWO FILTERS, AND DIFFERENT POSITIONAL RELATIONSHIPS

TECHNICAL FIELD

The present invention relates to a display device and an electronic apparatus.

BACKGROUND ART

Recently, as a virtual image display device which is capable of forming and observing a virtual image such as a head mounted display, a head mounted display which is a type of guiding video light from a display element to eyes of an observer has been proposed. In such a the virtual image display device, as disclosed in PTL 1, a see-through optical system overlapping the video light and external light is adopted.

CITATION LIST

Patent Literature

PTL 1: JP-A-2013-200553

SUMMARY OF INVENTION

Technical Problem

However, in the virtual image display device disclosed in PTL 1, there is a problem in that both improving an image quality of the display image and reducing the size of an electronic apparatus such as the head mounted display are not easy to realize at the same time. In the virtual image display device of the related art, when enhancing resolution by making the display image bright, the display device becomes larger. In other words, in the related art, when the display device is applied to the electronic apparatus, there is a problem in that lightening the weight and reducing the size of the display device while displaying high resolution image is not easy to realize to the degree that a user does not feel uncomfortable.

Solution to Problem

Accordingly, it is an object of the present invention to solve at least a part of the above described problems and the invention can be realized in the following forms or application examples.

Application Example 1

According to this application example, there is provided a display device including a first light-emitting element, a second light-emitting element, a first color filter through which light from the first light-emitting element passes, and a second color filter through which the light from the second light-emitting element passes, in which a relative positional relationship between a center of the first light-emitting element and a center of the first color filter in plane view is different from a relative positional relationship between a center of the second light-emitting element and a center of the second color filter in plane view.

In this case, since the color filter is arranged corresponding to an optical axis from the light-emitting element, a size of the light-emitting element is maintained at the certain degree and an angle of view can be widened. Accordingly, both improving an image quality of the display image and reducing the size of an electronic apparatus such as a head mounted display can be realized at the same time.

Application Example 2

In the display device according to Application Example 1, it is preferable that the first light-emitting element, the first color filter, the second light-emitting element, and the second color filter are arranged in the display region, an optical axis of the first light-emitting element is inclined to a center side of the display region from a normal line with respect to the first light-emitting element, and the center of the first color filter in plane view is deviated to the center side of the display region further than the center of the first light-emitting element in plane view.

In the display device of the electronic apparatus such as the head mounted display including a light collection optical system, except a center portion of the display region, the optical axis from the light-emitting element is inclined to the center side of the display region. Accordingly, in this configuration, since the color filter is arranged to be deviated to the center side with respect to the light-emitting element, a size of the light-emitting element is maintained at the certain degree and the angle of view can be widened. That is, both reducing the size of the electronic apparatus including the light collection optical system such as the head mounted display and improving a quality of the image displayed on the electronic apparatus can be realized at the same time.

Application Example 3

In the display device according to Application Example 2, it is preferable that the second light-emitting element and the second color filter are arranged inside further than the first light-emitting element and the first color filter in the display region, and when a deviation amount of the center of the first light-emitting element and the center of the first color filter in plane view is a first deviation amount, and a deviation amount of the center of the second light-emitting element and the center of the second color filter in plane view is a second deviation amount, the second deviation amount is smaller than the first deviation amount.

In the display device of the electronic apparatus including the light collection optical system such as the head mounted display, an inclination of the optical axis from the light-emitting element is large outside of the display region. In this configuration, since the deviation amount between the light-emitting element and the color filter is adjusted corresponding to the position of the light-emitting element in the display region, a size of the light-emitting element is maintained at the certain degree and a angle of view can be widened. That is, both reducing the size of the electronic apparatus including the light collection optical system such as the head mounted display and improving a quality of the image displayed on the electronic apparatus can be realized at the same time.

Application Example 4

In the display device according to Application Example 3, it is preferable that a separation portion that separates the color filter is further included and a difference between the first deviation amount and the second deviation amount is made by a width of the separation portion arranged between the first color filter and the second color filter.

In this configuration, the positional relationship between the light-emitting element and the color filter can be easily adjusted by changing only the width of the separation portion.

Application Example 5

In the display device according to Application Example 3, it is preferable that the color filter includes a red color filter, a green color filter, and a blue color filter, and the difference between the first deviation amount and the second deviation amount is made by the width of the separation portion which is arranged between the first color filter and the second color filter and separates the red color filter and the blue color filter.

Humans have high visibility with respect to a green color. Accordingly, in this configuration, since the difference of the deviation amount is made avoiding the green color filter having high visibility, a possibility that the user notices an existence of the separation portion which generates the difference can be suppressed.

Application Example 6

In the display device according to Application Example 4 or 5, it is preferable that the light-emitting element and the color filter are arranged in the display region in a matrix shape, and positions in a row direction of the separate portions which generate the difference between the first deviation amount and the second deviation amount are different from each other in a first row and a second row adjacent to the first row.

In this configuration, since the separation portions having a different width do not make one column, the possibility that the user notices an existence of the separation portion can be suppressed.

Application Example 7

In the display device according to Application Example 3, it is preferable that the difference between the first deviation amount and the second deviation amount is made by a width of the other color filter arranged between the first color filter and the second color filter.

In this configuration, the positional relationship between the light-emitting element and the color filter can be easily adjusted by changing only a width of the color filter.

Application Example 8

In the display device according to Application Example 7, it is preferable that the color filter includes the red color filter, the green color filter, and the blue color filter, and the other color filter is the blue color filter.

The humans have low visibility with respect to a blue color. Accordingly, in this configuration, since the difference of the deviation amount is made using the blue color filter having low visibility, the possibility that the user notices an existence of the color filter which generates the difference can be suppressed.

Application Example 9

In the display device according to Application Example 7 or 8, it is preferable that the light-emitting element and the color filter are arranged in the display region in a matrix shape, and positions in a row direction of the other color filters are different from each other in the first column and the second column adjacent to the first column.

In this configuration, since the other color filters having a different width do not make one column, the possibility that the user notices an existence of the other color filter which generates the difference can be suppressed.

Application Example 10

According to this application example, there is provided an electronic apparatus including a display device according to any one of Application Examples 1 to 9.

In this configuration, both reducing the size of the electronic apparatus such as the head mounted display and improving a quality of the image displayed on the electronic apparatus can be realized at the same time.

BRIEF DESCRIPTION OF DRAWINGS

FIG. 1 is a diagram illustrating an outline of an electronic apparatus according to an embodiment.

FIG. 2 is a diagram illustrating an inner structure of the electronic apparatus according to the embodiment.

FIG. 3 is a diagram illustrating an optical system of the electronic apparatus according to the embodiment.

FIG. 6A is a diagram illustrating a configuration of a sub-area boundary.

FIG. 6B is a diagram illustrating the configuration of the sub-area boundary.

FIG. 7 is a diagram illustrating an arrangement of a sub-area boundary.

FIG. 8 is a diagram illustrating a relationship between a deviation amount and an angle of view.

FIG. 9A is a diagram illustrating a configuration of a sub-area boundary of a display device according to another embodiment.

FIG. 9B is a diagram illustrating the configuration of the sub-area boundary of the display device according to another embodiment.

FIG. 10 a diagram illustrating an arrangement of a sub-area boundary of a display device according to Modification Example 1.

FIG. 11 a diagram illustrating an arrangement of a sub-area boundary of a display device according to Modification Example 2.

DESCRIPTION OF EMBODIMENTS

Figure 4:
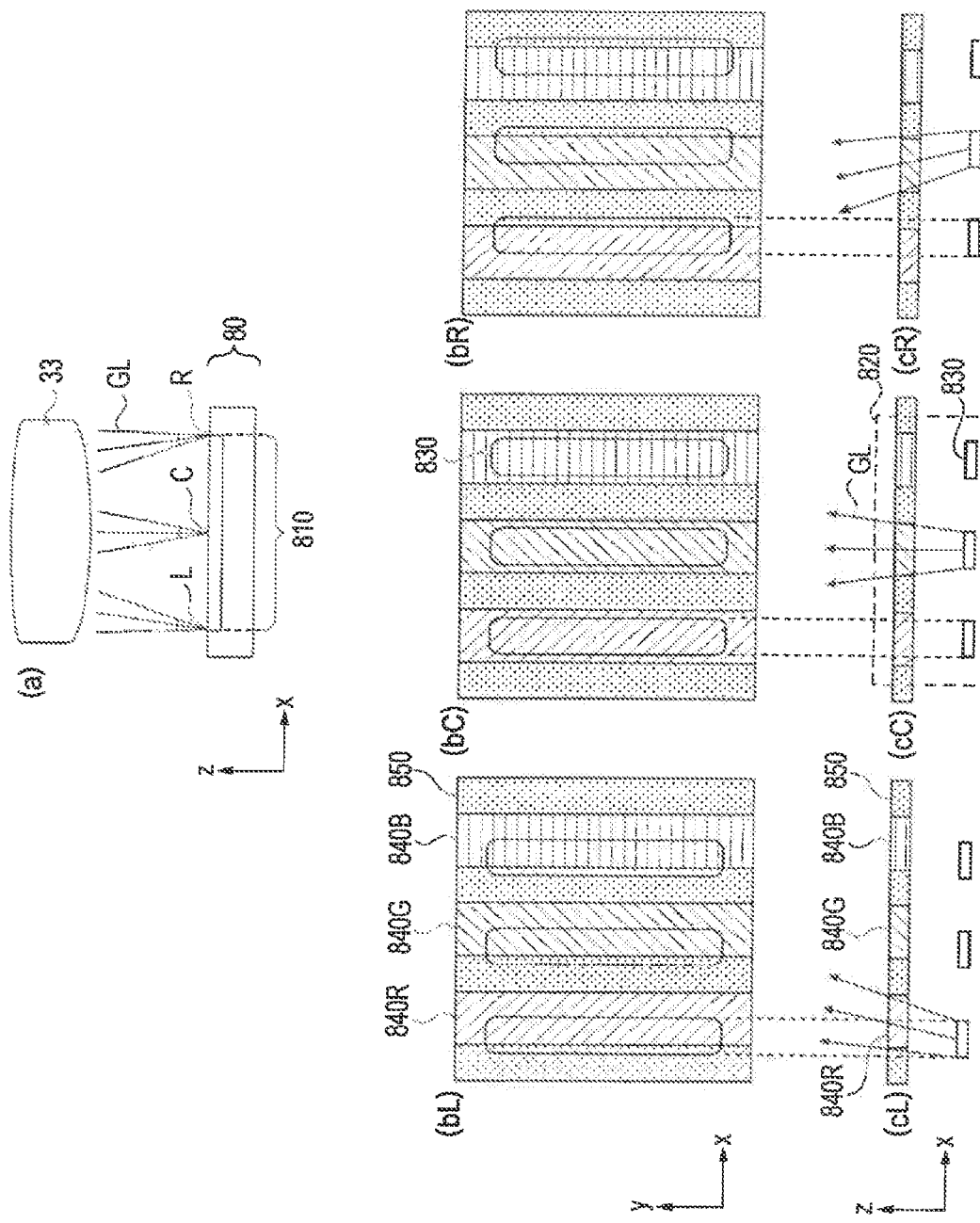
FIG. 4 is a diagram illustrating a display device according to the embodiment.

Hereinafter, an embodiment of the invention will be described using drawings. In addition, in drawings hereinbelow, since each layer or each member is illustrated at a size of a recognizable degree on the drawings, each layer or each member adopts a different scale of map.

Embodiment 1

(Outline of Electronic Apparatus)

FIG. 1 is a diagram illustrating an outline of an electronic apparatus according to Embodiment 1. First, the outline of the electronic apparatus will be described with reference to FIG. 1.

The head mounted display 100 is an example of the electronic apparatus according to the embodiment and includes the display device 80 (refer to FIG. 3). As illustrated in FIG. 1, an exterior of the head mounted display 100 has a glasses-like shape. A user wearing the head mounted display 100 visually recognizes a video light GL to be an image (refer to FIG. 3), and the user visually recognizes the external light by a see-through manner. In short, the head mounted display 100 has a see-through function which overlapping displays the external light and the video light GL, a wide angle of view, a high performance, and is small and lightweight.

The head mounted display 100 includes a transparent member 101 that covers a front of the user's eyes, a frame 102 that supports the transparent member 101, and a first built-in device portion 105a and a second built-in device portion 105b that are attached to a part from cover portions of right end and left end of the frame 102 to a rear hanging portion (temple). The transparent member 101 is divided into a first optical part 103a and a second optical part 103b which are an optical member (transparent eye cover) curved at a thickness to cover the front of the user's eyes. The first display device 151 combining the first optical part 103a and the first built-in device portion 105a on the left side in FIG. 1 is a part displaying the see-through virtual image for a right eye, and functions as the electronic apparatus which has the display function even in when used alone. In addition, the second display device 152 combining the second optical part 103b and the second built-in device portion 105b on the right side in FIG. 1 is a part displaying the see-through virtual image for a left eye, and functions as the electronic apparatus which has the display function even in when used alone.

Inner Structure of Electronic Apparatus

FIG. 2 is a diagram illustrating an inner structure of the electronic apparatus according to the embodiment. FIG. 3 is a diagram illustrating an optical system of the electronic apparatus according to the embodiment. Next, the inner structure and the optical system of the electronic apparatus will be described with reference to FIG. 2 and FIG. 3. In addition, in FIG. 2 and FIG. 3, the first display device 151 is described as an example of the electronic apparatus; however, the second display device 152 also has symmetrically mostly the same structure as the first display device 151.

As illustrated in FIG. 2, the first display device 151 includes a projection transparent device 70 and a display device 80 (refer to FIG. 3). The projection transparent device 70 includes a prism 10 which is a light guiding member, a light transmission member 50, and a projection lens 30 for image forming (refer to FIG. 3). The prism 10 and the light transmission member 50 are integral with each other by bonding, for example, an upper surface 10c of the prism 10 and a lower surface 61c of the frame 61 comes into contact with each other so as to be tightly fixed to a bottom of the frame 61. The projection lens 30 is fixed to an end of the prism 10 through a lens tube 62 storing the projection lens. The prism 10 and the light transmission member 50 in the projection transparent device 70 correspond to a first optical part 103a in FIG. 1, and the projection lens 30 in the projection transparent device 70 and a display device 80 correspond to a first built-in device portion 105a in FIG. 1.

In the projection transparent device 70, the prism 10 is a circular arc shape member which is curved along the face in plane view, and can be divided into a first prism part 11 in center side near a nose and a second prism part 12 in peripheral side far from the nose. The first prism part 11 is arranged on a light emitting side, and as a side surface having an optical function, includes a first surface S11 (refer to FIG. 3), a second surface S12, and a third surface S13. The second prism part 12 is arranged on a light incidence side, and as a side surface having an optical function, includes a fourth surface S14 (refer to FIG. 3) and a fifth surface S15. Among these, the first surface S11 and the fourth surface S14 are adjacent to each other, and the third surface S13 and the fifth surface S15 are adjacent to each other. The second surface S12 is arranged between the first surface S11 and the third surface S13. The prism 10 includes the upper surface 10e adjacent to from the first surface S11 to the fourth surface S14.

The prism 10 is made of a resin material having high transmittance in a visible region, for example, is formed by injecting and solidifying a thermoplastic resin in a mold. A main body part 10s of the prism 10 (refer to FIG. 3) is known as an integral forming component; however, the main body part 10s can be divided into a first prism part 11 and a second prism part 12. The first prism part 11 is capable of guiding and emitting the video light GL and transmitting an external light. The second prism part 12 is capable of making the video light GL be incident and guiding the video light GL.

The light transmission member 50 is integrally fixed to the prism 10. The light transmission member 50 is a member which supports a transmission function of the prism 10 (auxiliary prism). The light transmission member 50 is made of a resin material having high transmittance in a visible region and having the substantially the same refractive index as that of the main body part 10s of the prism 10. The light transmission member 50, for example, is made by forming the thermoplastic resin.

As illustrated in FIG. 3, the projection lens 30 includes three the lens 31, 32, and 33 along an optical axis in an incidence side. Each lens 31, 32, and 33 is a lens which is a rotationally symmetrical to a central axis of light incidence surface of the lens, and at least one of the lenses is an aspheric lens. The projection lens 30 inputs the video light GL which is emitted from a display device 80 to the inside of the prism 10 so as to reimage the video light GL to an eye EY. In short, the projection lens 30 is a relay optical system for reimaging the video light GL which is emitted from each pixel 820 of the display device 80 to the eye EY through the prism 10. The projection lens 30 is held in the lens tube 62, and the display device 80 is fixed to an end of the lens tube 62. The second prism part 12 of the prism 10 is connected to the lens tube 62 holding the projection lens 30, and indirectly supports the projection lens 30 and the display device 80.

The pixel 820 is arranged in the display device 80 in an M column and N row matrix shape. M and N are integers of two or greater, for example, M=720, N=1280 in the embodiment. Each pixel 820 includes p sub-pixel(s), and each sub-pixel includes a light-emitting element 830 and a color filter 840 through which the light emitted from the light-emitting element 830 passes. The light-emitting element 830 emits white light, and for example, an organic EL element is used in the embodiment. As the light-emitting element 830, other LED element, a semiconductive laser element, or the like can be used. In the embodiment, p is 3, and each pixel 820 includes three light-emitting elements 830 and three color filters 840. In the color filter 840 of each pixel 820, a red color filter 840R, a green color filter 840G, and a blue color filter 840B are included, and converts the light from the corresponding light-emitting element 830 to red light, green light, or blue light, so as to be the video light GL. In addition to this, as p=4, in the color filter 840, the color filter 840 for white light (actually, sub-pixel which does not exist in color filter 840) may be prepared, or the color filter 840 for yellow light may be prepared.

As illustrated in FIG. 3, an optical axis of the video light GL emitted from each pixel 820 (exactly, each sub-pixel) is deviated in every pixel 820 (exactly, in every sub-pixel). The display device 80 of the embodiment is capable of making the user recognize the image which is bright and has high resolution by correcting such a deviation. Next, this point will be described.

Configuration of Display Device

Figure 5:
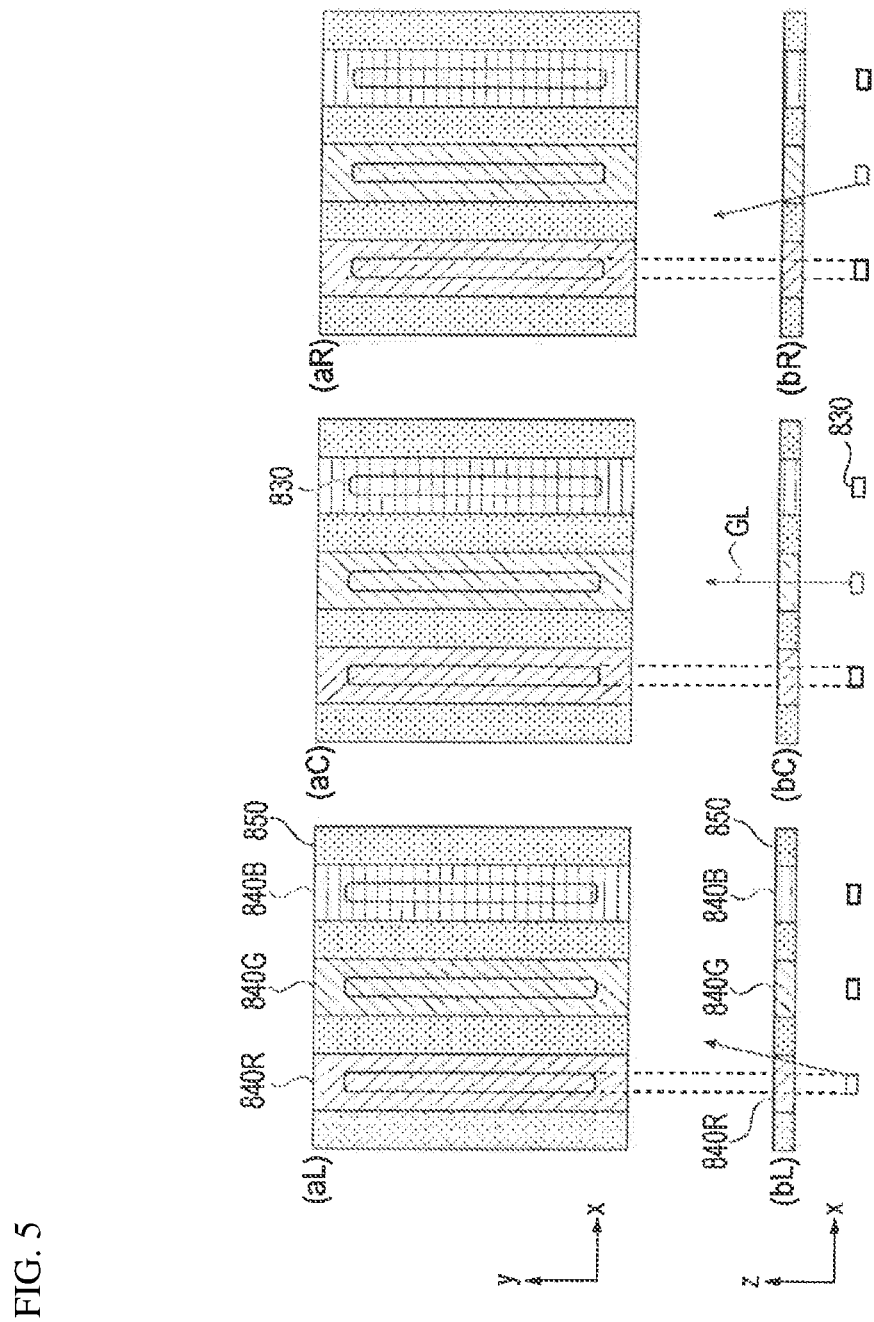
FIG. 5 is a diagram illustrating a display device according to Comparative Example.

FIG. 4 is a diagram illustrating the display device according to the embodiment, Part (a) of FIG. 4 is a cross-sectional diagram of the entirety, Part (b) of FIG. 4 is a plane diagram of a pixel, and Part (c) of FIG. 4 is a cross-sectional diagram of the pixel. Parts (aL) to (bR) of FIG. 5 are diagrams illustrating the display device according to a comparative example, Parts (aL) to (aR) of FIG. 5 are plane diagrams of the pixel, and Parts (bL) to (bR) of FIG. 5 are cross-sectional diagrams of the pixel. Next, referring to Parts (a) to (bR) of FIG. 4, the display device of the embodiment will be described. In addition, Parts (aL) to (bR) of FIG. 5 are diagrams illustrating a comparative example; however, for the sake of easy understanding, parts illustrating the same functions as that of the display device of the embodiment will be given the same terms and numerals. Also, in the drawings hereinbelow, for the sake of easy understanding, an orthogonal coordinate system of x, y, and z is adopted. A z axis is an axis along a normal line of the display device, a y axis is an axis in which the pixels 820 are arranged side by side in a vertical direction of M column in the display device (axis along an longitudinal direction of rows), and an x axis is an axis in which the pixels 820 are arranged side by side in a horizontal direction of N row in the display device (axis along an longitudinal direction of columns). In the drawings hereinbelow, for the sake of easy understanding, an arbitrary reduced scale is adopted, and a different reduced scale is used for each component even in one drawing.

As illustrated in Part (a) of FIG. 4, the display device 80 includes the display region 810. The optical axis of the video light GL from the pixel 820 in a center portion C of the display region is almost along the normal line of the display device; however, the optical axis of the video light GL from the pixel 820 in a left part L of the display region 810 is inclined to the right side of the normal line of the display device. In the same manner, the optical axis of the video light GL from the pixel 820 in a right part R of the display device is inclined to the left side of the normal line of the display device. In the display device 80 of an electronic apparatus including a light collection optical system such as a head mounted display 100 as described above, except the center portion of the display region 810, the optical axis from the light-emitting element 830 is inclined to the center of the display region 810. In the display device 80 of the embodiment, the display region 810 is divided into 2q+1 sub-area. In the pixel 820 included in the other sub-area, a relative positional relationship between the center of the light-emitting element 830 and the center of the color filter 840 is different. In addition, q is an integer of one or greater, and q is 20 in the embodiment. That is, the display region 810 is divided into a first sub-area including the center portion C thereof, 20 sub-areas which are divided in a right direction along the x axis from the first sub-area, and 20 sub-areas which are divided in a left direction along the x axis from the first sub-area, that is, total 41 sub-areas. In other words, there are 2q+1 types of arrangement having a different relative positional relationship between the center of the light-emitting element 830 in the display region 810 and the center of the color filter 840.

Part (bL) of FIG. 4 is a plane diagram of the pixel 820 which is positioned on the left side further than the center portion C of the display region 810, Part (bC) of FIG. 4 is a plane diagram of the pixel 820 which is positioned on the center portion C of the display region 810, and Part (bR) of FIG. 4 is a plane diagram of the pixel 820 which is positioned on the right side further than the center portion C of the display region 810. Part (cL) of FIG. 4 is a cross-sectional diagram of the pixel 820 which is positioned on the left side further than the center portion C of the display region 810, Part (cC) of FIG. 4 is a cross-sectional diagram of the pixel 820 which is positioned on the center portion C of the display region 810, and Part (cR) of FIG. 4 is a cross-sectional diagram of the pixel 820 which is positioned on the right side further than the center portion C of the display region 810. The display device 80 according to the embodiment includes a first light-emitting element 830 and the first color filter 840 through which light from the first light-emitting element 830 passes. For example, the above described element and filter are included in the pixel 820 which is positioned on the left side further than the center portion C illustrated in Part (bL) of FIG. 4 or Part (cL) of FIG. 4, or in the pixel 820 which is positioned on the right side further than the center portion C, illustrated in Part (bR) of FIG. 4 or Part (cR) of FIG. 4. In addition, the display device 80 includes a second light-emitting element 830 and a second color filter 840 through which light from the second light-emitting element 830 passes. For example, the above described filter and element are included in the pixel 820 which is positioned on the center portion C, illustrated in Part (bC) of FIG. 4 or Part (cC) of FIG. 4. Accordingly, for example, the second light-emitting element 830 and the second color filter 840 included in the pixel 820 which is positioned near the center portion C of the display region 810 are arranged inside further than the first light-emitting element 830 and the first color filter 840 in the display region 810.

As illustrated in FIG. 4, the relative positional relationship between the center of the first light-emitting element 830 and the center of the first color filter 840 in a plan diagram is different from the relative positional relationship between the center of the second light-emitting element 830 and the center of the second color filter 840 in a plan diagram. Next, as illustrated in Part (cL) of FIG. 4 or Part (cR) of FIG. 4, the optical axis of the first light-emitting element 830 is inclined to the center side of the display region 810 from the normal line with respect to the first light-emitting element 830, and the center of the first color filter 840 in plane view is deviated to the center side of the display region 810 more than the center of the first light-emitting element 830 in plane view.

When a deviation amount between the center of the first light-emitting element 830 and the center of the first color filter 840 in plane view is a first deviation amount, and a deviation amount between the center of the second light-emitting element 830 and the center of the second color filter 840 in plane view is a second deviation amount, the second deviation amount is smaller than the first deviation amount. As an example, in the pixel 820 positioned on the center portion C illustrated in Part (bC) of FIG. 4 or Part (cC) of FIG. 4, the second deviation amount is zero, and the center of the second light-emitting element 830 is almost integral with the center of the second color filter 840. In contrast, in the pixel 820 positioned on the left side further than the center portion C illustrated in Part (bL) of FIG. 4 or Part (cL)

of FIG. 4, or in the pixel 820 positioned on the right side further than the center portion C illustrated in Part (bR) of FIG. 4 or Part (cR) of FIG. 4, the first deviation amount is a finite positive value, and the second deviation amount is smaller than the first deviation amount.

In short, in every sub-area, the color filter 840 is arranged along the optical axis of the light-emitting element 830. In addition, according to a deviation from the center portion C of the display region 810, the color filter 840 is arranged so as to be greatly deviated to the center portion of the display region 810 with respect to the light-emitting element 830. In the display device 80 of the electronic apparatus including the light collection optical system, the inclination of the optical axis from the light-emitting element 830 in the outside of the display region 810 increases; however, in the display device 80, the deviation amount of the light-emitting element 830 and the color filter 840 is adjusted according to the position of the light-emitting element 830 in the display region 810.

As a result with such a configuration, while maintaining a size of the light-emitting element 830 at certain degree, the angle of view can be widened. In addition, the angle of view is an angle $theta_C$ that the optical axis of the pixel 820 forms with the normal line of the display device (refer to FIG. 8). This point will be described compared with a comparative example. As illustrated in FIG. 5, in the display device of the related art, the positional relationship between the light-emitting element 830 and the color filter 840 is the same in the entire display region 810. That is, the center of the light-emitting element 830 and the center of the color filter 840 are integral with each other in any pixel 820 of the display region 810. Accordingly, when promoting enhancement resolution, the angle of view outside the display region 810 becomes large, and thus, the light-emitting element 830 needs to be small. For this reason, the video light GL is weak, and displayed dark. That is, in the related art, enhancing resolution and bright display are not both performed at the same time. In contrast, in the display device of the embodiment, even when the enhancement of resolution is promoted and the angle of view outside of the display region 810 becomes large, a size of the light-emitting element 830 can be maintained at certain degree and the video light GL can be maintained strongly. In other words, in the display device according to the embodiment, both the enhancing resolution and the bright display are realized at the same time so that both reducing the size of the electronic apparatus such as the head mounted display 100 including the light collection optical system and forming a high quality image displayed on the electronic apparatus are realized at the same time. As an example, when a length of a row direction of the sub-pixel is 7.5 micrometers, a width of a column direction of the sub-pixel is 2.5 micrometers, and a length of a row direction of the light-emitting element 830 is 6.1 micrometers, a width of a row direction of the light-emitting element 830 of the comparative example is 1.1 micrometers, but a width of a row direction of the light-emitting element 830 of the embodiment is 1.8 micrometers. That is, since an area of the light-emitting element 830 of the embodiment can be 1.64 times an area of the light-emitting element 830 of the comparative example, it is possible to reduce driving voltage or to display brightly.

Sub Area Boundary

FIGS. 6A and 6B are diagrams illustrating a configuration of a sub-area boundary. FIG. 6A is a plane diagram of the pixel near the sub-area boundary and FIG. 6B is a cross-sectional diagram of the pixel near the sub-area boundary. FIG. 7 is a diagram illustrating an arrangement of the sub-area boundary. Next, referring to FIG. 6A to FIG. 7, the configuration and the arrangement of the sub-area boundary SB will be described. In addition, the sub-area boundary SB is a boundary between one sub-area and the next sub-area.

The pixels 820 which are positioned in the one sub-area have the same positional relationship between the light-emitting element 830 and the color filter 840 as each other. Meanwhile, the positional relationship between the light-emitting element 830 and the color filter 840 is different in each pixel 820 in a different sub-area as illustrated in FIGS. 6A and 6B. In an example of FIGS. 6A and 6B, in the pixel 820 of the left side of the sub-area boundary SB, the center of the light-emitting element 830 is almost integral with the center of the color filter 840; however, in the pixel 820 of the right side, the center of the color filter 840 is deviated from the center of the light-emitting element 830 toward the left side. Next, a configuration of the sub-area boundary SB will be described.

The display device 80 according to the embodiment includes the separation portion 850 that separates the color filter 840. The separation portion 850 is a member that suppresses mixing a color material of the color filter 840, or a bank when the color filter 840 is formed in a printing manner, or a so called black matrix for avoiding the mixing of the color. In an example of FIGS. 6A and 6B, a deviation amount of the center of the first light-emitting element 830 in the right sub-area and the center of the first color filter 840 is a first deviation amount, and a deviation amount of the center of the second light-emitting element 830 and the center of the second color filter 840 is a second deviation amount. As described above, the second deviation amount is smaller than the first deviation amount; however, a difference between the first deviation amount and the second deviation amount is made by the width of the separation portion 850 arranged between the first color filter 840 and the second color filter 840. The separation portion 850 that divides the sub-pixels positioned in one sub-area is constant at a standard width $W_{BS}$. In contrast, even when the adjacent sub-pixels are in a different sub-area, the separation portion 850 has a changing width $W_{BC}$. The standard width $W_{BS}$ and the changing width $W_{BC}$ are different from each other, and in the embodiment, the changing width $W_{BC}$ is narrower than the standard width $W_{BS}$. As described above, the positional relationship between the light-emitting element 830 and the color filter 840 can be easily adjusted by changing only a width of the separation portion 850 of the sub-area boundary SB.

In addition, in order to suppress the possibility that the user notices an existence of the separation portion 850, a difference between the first deviation amount and the second deviation amount is made by changing the width of the separation portion 850 which is arranged between the first color filter 840 and the second color filter 840 and separates the red color filter 840R and the blue color filter 840B. Since humans have high visibility with respect to a green color, when the difference of the deviation amount is made by avoiding the green color filter 840G having high visibility, it is not easy for the user to find an existence of the separation portion 850 having the changing width $W_{BC}$.

In the embodiment, N=1280 pixels 820 are arranged in parallel in the column direction of the display region 810, and the display region 810 is divided into 2q+1 (q=20) sub-areas. 40 rows of the pixel group 820 positioned in the center portion C of the display region 810 constitutes the central sub-area, and the deviation amount is set to zero. 40 sub-areas other than the central sub-area are respectively configured to have the 31 rows pixel group 820. The changing width $W_{BC}$ is 0.025 micrometers. Accordingly, the deviation amount increases 0.025 micrometers when moving to next one from the central sub-area to the side sub-area, and the deviation amount of the outermost side sub-area becomes 0.5 micrometers.

As illustrated in FIG. 7, the positions in a row direction of the separation portions 850 (sub-area boundary) that generate a difference between the first deviation amount and the second deviation amount are preferably different from each other in the first row and the second row adjacent to the first row. Accordingly, since the separation portion 850 (sub-area boundary SB) having a different width does not become one column, a possibility that the user notices an existence of the separation portion 850 which generates the difference can be suppressed. In the embodiment, 1 pixel 820 of the sub-area boundary SB is deviated in every one row, and three rows make one period.

Deviation Amount

FIG. 8 is a diagram illustrating a relationship between the deviation amount and the angle of view. Next, with reference to FIG. 8, the relationship between the deviation amount and the angle of view will be described.

The deviation amount of the light-emitting element 830 and the color filter 840 in each sub-area is determined according to where the sub-area is positioned in the display region 810 and how much is the angle of view from the sub-area. As illustrated in FIG. 8, a sealing layer 860 is formed on the upper surface of the light-emitting element 830, and the color filter 840 is formed on the upper surface of the sealing layer 860. A filling layer 870 is formed on the further upper surface of the color filter 840, and is mainly made of an organic material from the sealing layer 860 to the filling layer 870. A refractive index in these three layers is $n_A$. The cover glass 880 is arranged on the upper surface of the filling layer 870, and a quartz glass is used in the embodiment. A refractive index of the cover glass 880 is $n_B$. The upper surface of the cover glass 880 is air 890, and a refractive index of the air 890 is $n_C$. Further, an emitting angle (tilt angle from the normal line of the display device 80) of the video light GL from the light-emitting element 830 is $theta_A$, and the emitting angle (tilt angle from the normal line of the display device 80) of the video light GL from the filling layer 870 to the cover glass 880 is theta, and the angle of view (tilt angle from the normal line of the display device 80) of the video light GL from the cover glass 880 to the air 890 is $theta_C$. A rule of refraction at this time is expressed by Equation 1.

[Math. 1]

$$\frac{\sin\vartheta_A}{\sin\vartheta_B} = \frac{n_B}{n_A}, \frac{\sin\vartheta_B}{\sin\vartheta_C} = \frac{n_C}{n_B}, \sin\vartheta_C = \frac{D_A}{n_C}\sin\vartheta_A \quad (1)$$

Meanwhile, a deviation amount of the color filter 840 with respect to the light-emitting element 830 is L(x), a distance from the upper surface of the light-emitting element 830 to the upper surface of the color filter 840 is $Z_0$, and a relationship between L(x), $Z_0$, and $theta_A$ are expressed by Equation 2.

[Math. 2]

$$\tan\vartheta_A = \frac{L(x)}{Z_0} \quad (2)$$

The relationship between the angle of view $theta_C$ and the deviation amount L(x) by Equation 1 and Equation 2 is expressed by to Equation 3.

[Math. 3]

$$L(x) = Z_0\tan\vartheta_A = Z_0\tan\left(\arcsin\left[\frac{n_C}{n_A}\sin\vartheta_C\right]\right) = Z_0 \cdot \frac{\frac{n_C}{n_A}\sin\vartheta_C}{\sqrt{1-\left(\frac{n_C}{n_A}\sin\vartheta_C\right)^2}} \quad (3)$$

It is ideal that a relationship by Equation 3 is generally satisfied in each sub-area. In the embodiment, Equation 3 is satisfied in the outermost sub-area. Specifically, $n_A$=1.80, $n_B$=1.48, $n_C$=1.00, $theta_A$=6.0 degrees, $theta_B$=7.3 degrees, $theta_C$=10.8 degrees, and L (x=4.68357 mm, the outermost sub-area)=0.5 micrometers. As a result, the angle of view from the outermost sub-area is almost integral with an optical axis of the lens 33 in designing.

Embodiment 2

(Embodiment Having Modified Sub-Area Boundary)

FIGS. 9A and 9B are diagrams illustrating a configuration of the sub-area boundary of the display device according to embodiment 2. FIG. 9A is a plane diagram of the pixel near the sub-area boundary, and FIG. 9B is a cross-sectional diagram of the pixel near the sub-area boundary. Hereinafter, referring to FIGS. 9A and 9B, the display device 80 according to embodiment 2 will be described. In addition, the same configuration parts will be given the same sign and numeral of that of Embodiment 1, and a repeated description will be omitted.

The embodiment (FIGS. 9A and 9B) has a different configuration of the sub-area boundary SB compared to Embodiment 1 (FIGS. 6A and 6B). Except the configuration, the others are almost the same as that of Embodiment 1. In Embodiment 1 (FIGS. 6A and 6B), the sub-area boundary SB is formed by changing a width of the separation portion 850. In contrast, as illustrated in FIGS. 9A and 9B, in the embodiment, the width of the separation portion 850 are the same as each other, but it is different in that the sub-area boundary SB is formed by changing a width of the color filter 840. Except for that, the other configurations are the same as that of Embodiment 1.

In the example of FIGS. 9A and 9B, a deviation amount between the center of the first light-emitting element 830 and the center of the first color filter 840 on the right side sub-area is a first deviation amount, and a deviation amount between the center of the second light-emitting element 830 and the center of the second color filter 840 on the left side sub-area is a second deviation amount. As described above, the second deviation amount is smaller than the first deviation amount; however, a difference between the first deviation amount and the second deviation amount is made by a width of another color filter 840 arranged between the first color filter 840 and the second color filter 840. The color filter 840 of the sub-pixel positioned inside of one sub-area is constant except sub-pixels of one column in the outermost end of the sub-area (sub-pixel including the other color filter 840). For example, in the right sub-area of FIGS. 9A and 9B, the standard width $W_{CFRS}$ of the red color filter 840R is the same as the standard width $W_{CFGS}$ of the green color filter 840G. Meanwhile, in the blue color filter 840B, the changing width $W_{CFBC}$ of one column blue color filter 840B which forms the sub-area boundary SB is different from the standard width $W_{CFBS}$ of other blue color filter 840B. The standard width $W_{CFBS}$ of the blue color filter 840B is the same as the standard width $W_{CFRS}$ of the red color filter 840R and the standard width $W_{CFCS}$ of the color filter 840G. In the embodiment, the changing width $W_{CFBC}$ of one column blue color filter 840B which forms the sub-area boundary SB is narrower than the standard width $W_{CFRS}$ of the red color filter 840R or the standard width $W_{CFGS}$ of the green color filter 840G, or the standard width $W_{CFBS}$ of the blue color filter 840B. As described above, the positional relationship between the light-emitting element 830 and the color filter 840 can be easily adjusted by changing only the width of the color filter 840 which forms the sub-area boundary.

Further, in order to suppress a possibility that the user notices an existence of the color filter 840 which generates the difference, it is preferable that the difference between the first deviation amount and the second deviation amount is made by the blue color filter 840B arranged between the first color filter 840 and the second color filter 840. Since the human has low visibility with respect to a blue color, when the difference of the deviation amount is made using the blue color filter 840B having low visibility, the possibility that the user notices an existence of the first color filter 840 which generates the difference can be suppressed. With such a configuration, the same effect as that of Embodiment 1 can be obtained.

In addition, the invention is not limited to the embodiment described above, and can adopt various changes and improvements of the above described embodiment. The Modification Example will be described hereinbelow.

Modification Example 1

(Embodiment Having Different Arrangement of the Sub-Area Boundary 1)

FIG. 10 is a diagram illustrating an arrangement of the sub-area boundary SB of the display device according to Modification Example 1. In Embodiment 1 (FIG. 7), three rows of the sub-area boundaries SB make one period. With respect that, in the modification example, the period of the sub-area boundary SB is made by two rows as illustrated in FIG. 10. In addition to this, the period of the sub-area boundary SB may be made by four rows or any number of rows. In addition, the period of the sub-area boundary SB may arbitrary arranged in every row. In this case, an average value in every row may correspond to a position of the sub-area boundary SB described in Embodiment 1.

Modification Example 2

(Embodiment Having Different Arrangement of the Sub-Area Boundary 2)

FIG. 11 is a diagram illustrating an arrangement of the sub-area boundary of the display device according to Modification Example 2. In Embodiment 1 (FIG. 7), three rows of the sub-area boundary SB make one period. In contrast, in Modification Example, as illustrated in FIG. 11, the sub-area boundary SB is a straight line of one column. The configuration as described above may be used.

REFERENCE SIGNS LIST

C center portion
SB sub-area boundary
S11 first surface
S12 second surface
S13 third surface
S14 fourth surface
S15 fifth surface
10 prism
10e upper surface
10s main body part
11 first prism part
12 second prism part
30 projection lens
31 lens
32 lens
33 lens
50 light transmission member
61 frame
61e lower surface
62 lens tube
70 projection transparent device
80 display device
100 head mounted display
101 transparent member
102 frame
103a first optical part
103b second optical part
105a first built-in device portion
105b second built-in device portion
151 first display device
152 second display device
810 display region
820 pixel
830 light-emitting element
840 color filter
840B blue color filter
840R red color filter
840G green color filter
850 separation portion
860 sealing layer
870 filling layer
880 cover glass
890 air

The invention claimed is:
1. An electronic apparatus comprising:
a first light-emitting element that emits first light;
a second light-emitting element that emits second light;
a first color filter through which the first light passes; and
a second color filter through which the second light passes, wherein
the first light-emitting element and the second light-emitting element are arranged along a first direction, and
in a cross-sectional view along the first direction, a width in the first direction of a portion of the first color filter that overlaps in a second direction perpendicular to the first direction with the first light-emitting element is larger than a width in the first direction of a portion of the second color filter that overlaps in the second direction with the second light-emitting element.

2. The electronic apparatus according to claim 1, wherein the first direction is along a direction from a center of a display region toward an outside of the display region in a plan view.

3. The electronic apparatus according to claim 2, wherein in the plan view, a center of the first color filter is disposed closer to the center of the display region than a center of the first light-emitting element.

4. The electronic apparatus according to claim 1, further comprising:
   a lens; and
   a light guiding member provided on an opposite side of the lens from the first color filter.

5. The electronic apparatus according to claim 2, further comprising:
   a lens; and
   a light guiding member provided on an opposite side of the lens from the first color filter.

6. An electronic apparatus comprising:
   a first light-emitting element that emits first light;
   a second light-emitting element that emits second light;
   a first color filter through which the first light passes; and
   a second color filter through which the second light passes, wherein
   in a cross-sectional view along a first direction, the first color filter is offset in the first direction with respect to the first light-emitting element, and the second color filter is offset in a direction opposite to the first direction with respect to the second light-emitting element.

7. The electronic apparatus according to claim 6, wherein the first direction is along a direction from a center of the display region toward an outside of the display region in a plan view.

8. The electronic apparatus according to claim 6, further comprising:
   a lens; and
   a light guiding member provided on an opposite side of the lens from the first color filter.

9. The electronic apparatus according to claim 7, further comprising:
   a lens; and
   a light guiding member provided on an opposite side of the lens from the first color filter.

10. The electronic apparatus according to claim 6, wherein
    in the cross-sectional view along the first direction, a width in the first direction of a portion of the first color filter that overlaps in a second direction perpendicular to the first direction with the first light-emitting element is larger than a width in the first direction of a portion of the second color filter that overlaps in the second direction with the second light-emitting element.

* * * * *